United States Patent [19]

Mabie

[11] Patent Number: 5,073,155
[45] Date of Patent: * Dec. 17, 1991

[54] BELT CONNECTOR WITH IMPROVED BITE

[75] Inventor: Norman H. Mabie, Claremont, N.H.

[73] Assignee: L.M. & L. Corporation, Claremont, N.H.

[*] Notice: The portion of the term of this patent subsequent to May 21, 2008 has been disclaimed.

[21] Appl. No.: 587,683

[22] Filed: Sep. 25, 1990

Related U.S. Application Data

[63] Continuation-in-part of Ser. No. 443,731, Nov. 30, 1989, Pat. No. 5,017,182.

[51] Int. Cl.⁵ .............................................. F16G 7/00
[52] U.S. Cl. ................................................ 474/256
[58] Field of Search ............................... 474/253–256

[56] References Cited

U.S. PATENT DOCUMENTS 3,605,201  9/1971  Peterson .......................... 474/256
9,795,410  1/1989  Alderfer ........................... 474/256

FOREIGN PATENT DOCUMENTS 892897  2/1972  Canada ............................. 474/256

*Primary Examiner*—Ramon S. Britts
*Assistant Examiner*—Roger J. Schoeppel
*Attorney, Agent, or Firm*—Pearson & Pearson

[57] ABSTRACT

An endless belt formed by a connector and a finite length of hollow tubing or solid tubing with recesses at each end. The connector is characterized by one or more biting edges at each end of the connector, each having a larger diameter than the inside diameter of the tubing. Each biting edge is readily flexible away from the direction of insertion of the edge of the tube. The biting edge is formed as a flexible, rough feathered outlying portion of the base at each of the gripping heads. Once the gripping heads are inserted tension on the tubing causes the feathered edges and adjacent portions of each gripping head to bite into the internal wall of the tubing and form an improved grip therewith.

15 Claims, 3 Drawing Sheets

BELT CONNECTOR WITH IMPROVED BITE

CROSS REFERENCE TO RELATED APPLICATION

This is a continuation-in-part of my copending application Ser. No. 07/443,731 filed Nov. 30, 1989, now U.S. Letters Pat. No. 5,017,182 issued May 21, 1991.

BACKGROUND OF THE INVENTION

1. Field of the Invention

This invention generally relates to power transmission means and, more particularly, to a novel endless belt assembly having a connector with improved holding capabilities.

2. Description of Related Art

The advent of extruded lengths of polymeric materials has been accompanied by efforts to adapt such materials to endless belt applications. A number of fastening means were available for the purpose of connecting two free ends of other types of belting together to form a continuous length. Such methods, however, left much to be desired when applied to tubing. Specifically these fastening means normally required special equipment and techniques that were difficult to apply on equipment where there was little room to work and where the belt had to be formed in situ.

U.S. Pat. Nos. 3,461,733 and 3,501,971 disclose major improvements in such connectors for endless belt applications using polymeric tubing. The former patent discloses a novel connector in combination with a tough elastomer belt. The connector comprises a central shank or shaft and outwardly facing gripping heads extending from the end of the shaft. Each gripping head has a conoidal or pyramidal shape. The latter patent discloses improvements in such connectors that include a belt-seizing rib for improving the bite between the connector and the tubing. In general the inventions disclosed in those patents have been highly successful.

Yet the experience gained with extended use of such connectors has identified some limitations. First, an upper load limit exists for a given tubing material. This load limit lies below the tension requirements for a number of applications. Secondly, a number of new materials could be applied to endless belt construction. However, these connectors have not worked successfully with such materials. Thus, potential applications for endless belts exist that the prior inventions have not been able to satisfy.

U.S. Pat. No. 3,922,759 discloses two embodiments of a connector comprising a gripping member which is easily flexed away from the direction of entry into tubing to facilitate such entry. In one embodiment the gripping member is molded; in another, the connector comprises discrete pieces. The molded coupling insert comprises gripping heads integrally formed at the extremes of a central cylindrical body. The gripping heads comprise fluted gripping rings or integral annular flanges. One of the flanges is flexible with respect to the axis of the central cylinder body. The ring is also tapered to facilitate insertion of the connector into a belt. After insertion, when tension is applied to the belt assembly, the biting ring formed by such a flange flexes outwardly or forwardly until it intercepts an outer stop ring and bites into the belt. In the alternate construction, an internally threaded cylinder body receives machine screws and flex washers. The flex washers are radially divided to form flexible segments that flex toward the direction of the cylinder when the connector is being inserted into the tube and flex outward into a biting engagement with the tubing material when tension is applied.

This approach achieved its objectives of improving load characteristics and ease of insertion. However, it was found that the increased holding power realized with these connectors did not justify associated increased manufacturing costs. As a result, connectors, such as shown in U.S. Pat. Nos. 3,461,733 and 3,501,971, have continued to be the connectors of choice for endless belt applications. This acceptance continues despite the load and material limitations that foreclose a number of applications for endless belts formed of polymeric tubing.

SUMMARY OF THE INVENTION

Therefore it is an object of this invention to provide an improved power transmission means in the form of an endless belt capable of a wider range of applications than available with prior art connectors.

It is another object of this invention to provide an improved transmission means in which a connector provides an improved bite into tubing material for endless belts.

Yet still another object of this invention is to provide an improved transmission means with an easily connected endless belt and connector construction that is adapted for a wide range of endless belt materials.

In accordance with this invention, an endless belt assembly comprises hollow tubing or solid tubing with cylindrical recesses at the ends thereof and a connector. A connector, constructed in accordance with this invention, includes an elongated central body having a given transverse dimension and a plurality of axially spaced gripping head means at either end of the body. Each gripping head portion has an axially tapered surface intersecting a base planar surface having a transverse dimension that exceeds a corresponding transverse dimension of the belt recess. Flexible, outlying roughened feathered, flexible edge portions extend from the periphery of the base portion at its intersection with the tapered surface.

These outlying feathered flexible portions deform toward the central body as the connector is inserted into the tubing. They move radially outwardly when tension is applied to the belt thereby to bite into the tubing at multiple locations and to enable adjacent portions of the gripping heads to bite into the belt with greater holding power.

BRIEF DESCRIPTION OF THE DRAWINGS

This invention is pointed out with particularity in the appended claims. The various objects, advantages and novel features of this invention will be more fully apparent from a reading of the following detailed description in conjunction with the accompanying drawings in which like reference numerals refer to like parts and in which:

DESCRIPTION OF ILLUSTRATIVE EMBODIMENTS

Figure 1:
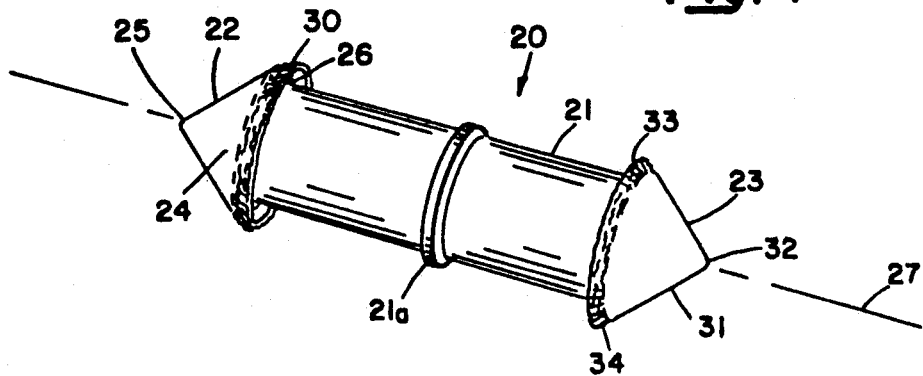
FIG. 1 is a perspective view of a connector constructed in accordance with one aspect of this invention.

FIG. 1 discloses one embodiment of a connector 20 constructed in accordance with this invention. The connector 20 is an integral element that includes a central cylindrical body portion 21 and an optional centering ring 21a. Gripping heads or gripping head portions 22 and 23 extend from the ends of the central cylindrical body 21. The gripping heads 22 and 23 are generally formed with some conoidal or pyramidal shape. Conoidal shapes are particularly adapted for facilitating the insertion of the connector into a belt and for easy manufacturing. In one embodiment, a right angle cone as shown in FIG. 1 is selected; a frustoconical cross-section can also be selected, as shown in other Figures. Still referring to FIG. 1, the connector 20 is formed of metal; and the specifically disclosed gripping head 22 includes a conical surface 24 that constitutes a tapered surface that extends from an apex 25 and terminates in a radial extending surface 26 that is transverse to an axis 27 through the cylindrical central member 21. The radial surface 26 constitutes a base planar surface for the gripping head 22. Thus, the gripping head 22 is rigid and is bounded by a tapered surface and a base planar surface that extend outwardly toward an intersection.

Figure 4:
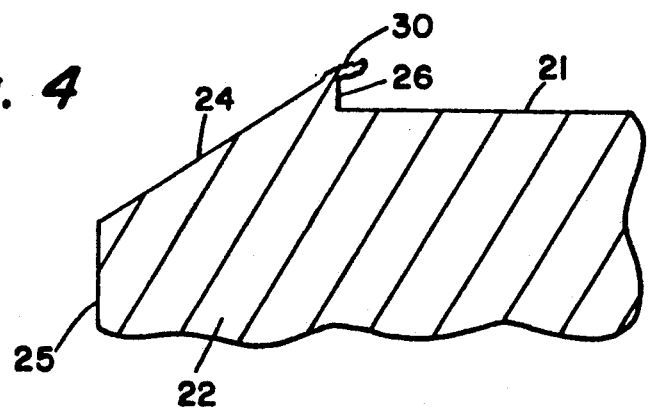
FIG. 4 is an enlarged cross-sectional view of a portion of a gripping head as disclosed in FIGS. 2 and 3.

Metal connectors, such as connector 20, normally are manufactured on a screw machine. As known screw machines form finished products through a series of cutting or shaping operations. In accordance with the embodiment of this invention shown in FIG. 1, the screw machine forms the radially extending base 26 by drawing a cutting tool along a line transversely to the axis 27. Then a cut is made along an oblique line from the axis 25 toward central body 21 that corresponds to the conical surface 22. When the cutting tool is proximate with end surface 26 (i.e., at the intersection of the two surfaces), it is drawn radially outwardly leaving a roughened feathered edge or burr 30 about the periphery of the radially extending base 26 as shown in FIGS. 1 and, in enlarged scale, in FIG. 4. With this particular sequence the feathered edge 30 extends a few mils (e.g., up to 7 mils) toward the center 20 and is outlying of the radially extending base 26. Moreover, as the tool withdraws, it produces a feathered edge 30 with a roughened surface because the feathered edge 30 is thin and flexible and not rigid.

In accordance with an alternative manufacturing process, a piece of stock is initially machined to produce the cylindrical body 21 and central ring 21a leaving cylindrical end portions. A gripping head 22 is then formed by advancing a cutting tool along a line perpendicular to the axis 27. The tool has a cutting surface that is inclined at the finished angle of the conical surface 24. When the tool is positioned essentially coextensively with the gripping head and advanced rapidly, it produces the desired roughened feathered edge or burr 30 that extends continuously around the periphery of the gripping head 22.

The gripping head 23 has the same configuration. More specifically, a conical surface 31 extends between an apex 32 at the axis 27 and a radially extending base surface 33 that is referenced in FIG. 1. It is shown only in FIGS. 2 and 3 due to the perspective view of FIG. 1. After the radially extending base surface 33 is formed on the screw machine, a shaping operation forms the conical surface 31 and terminates proximate the base surface 33 to produce a roughened feathered edge 34 having a length of a few mils that also extends toward the center of the connector 20 and that constitutes an outlying roughened feathered extension of the base surface 33 that is at the intersection of the tapered and base planar surfaces.

Figure 2:
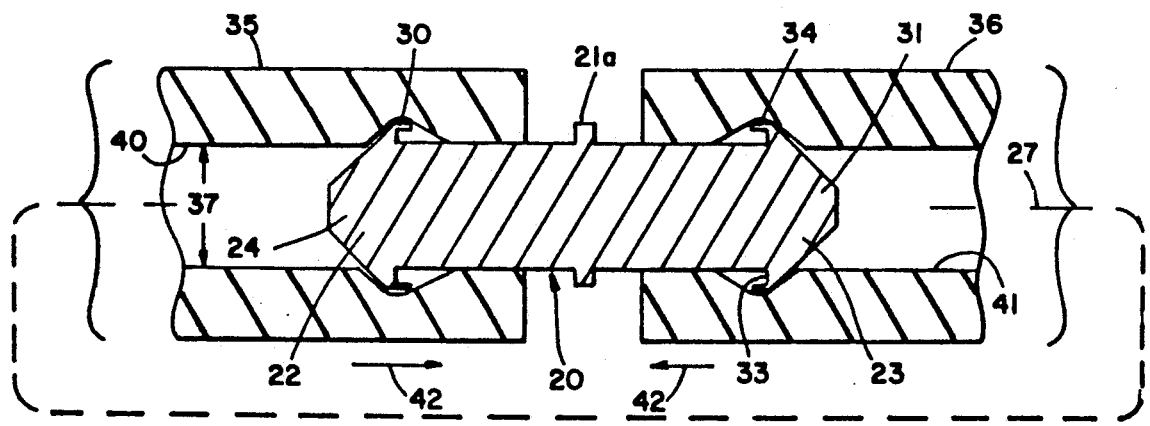
FIG. 2 is a partial cross-sectional view of an endless belt assembly including a section of a hollow endless belt positioned during the insertion of the connector shown in FIG. 1.

FIG. 2 is a cross-section of portions of a flexible endless belt of a resilient material depicting the configuration of the feathered edges 30 and 34 when a connector 20 is being inserted into end portions 35 and 36 of the endless belt. In this FIG. 2 the gripping heads 22 and 23 have a frusto-conical shape. A dashed line from the outer edges of the end portions 35 and 36 represents the remainder of a length of tubing. The tubing, as known, may comprise solid material with recessed ends or may comprise a piece of hollow tubing. Typically the endless belt will comprise any of a range of resilient polymeric materials such as a Hytrel ® urethane product sold be E. I DuPont de Nemeurs & Company and other urethane products.

The nominal diameter of the gripping heads 22 and 23 exceed the inner diameter 37 of the tubing. As the connector 20 moves into the tube end 35, the gripping head 22 eventually engages the inner surface 40 of the tube end 35. With further insertion the inner surface 40 stretches and slides over the conical surface 24 and deflects the feathered edge 30 toward the axis 27. Similarly, the gripping head 23 eventually engages an inner surface 41 of the tube and the feathered edge 34 moves toward the axis 27. In FIG. 2 this relative motion is represented by arrows 42 that depict motion of the tube ends 35 and 36 relative to the connector 20.

Figure 3:
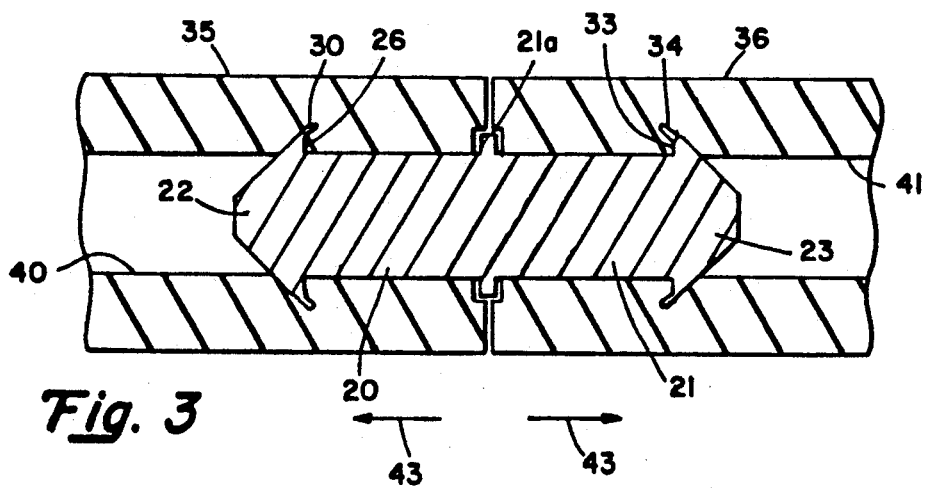
FIG. 3 is a cross-sectional view of a section of an endless belt assembly constructed in accordance with this invention while t end portions of the endless belt are in tension insertion on the connector.

When an endless belt formed as shown in FIG. 2 is positioned on a machine, the endless belt will be in tension. There is a tendency of the tube ends 35 and 36 to move away from each other and over the connector 20 as represented by arrows 43 in FIG. 3. As the tube end 35 tends to move to the left, as shown in FIG. 3, the inner surface 40 engages the feathered edge 30 and tends to bend the feathered edge 30 radially outward about a point at the intersection of the conical surface of the gripping head 22 and the radially extending planar base 26. However, the feathered edge 30 begins immediately to bite into the material of the tube end 35 forcing a small portion of the material that is coextensive with the centrally elongated member 21 to close down on the radial surface 26 and engage the base 26. This provides an improved bite between the gripping head 22 and the tube end 35. Likewise, the tension on the tube end 36 in the direction of the arrow 43 causes the feathered edge 34 to bite into the tube end 36. Material adjacent the feathered edge 34 engages the centrally elongated member 21 and moves into contact with the base 33. As a result, the gripping heads 22 and 23 better engage the ends 35 and 36 of the tubing.

For a given tubing material connectors 20 constructed in accordance with FIGS. 1 through 3 have exhibited up to 50% more holding power over prior art connectors, apparently because the feathered edges or erose outlying portions 30 and 34 enable the gripping heads 22 and 23 to bite into the surfaces of the ends 35 and 36 more readily. Moreover, the feathered edges or erose outlying portions 30 and 34 enable the connectors 20 to be used over a wider range of materials. Prior art connectors have been limited to materials having durometer measurements of 50 to 85 on the Shore A scale; it has been found that this connector structure enables operations with endless belt materials having durometer ranges of 50 to 95 on the Shore A scale and 45 to 70 on the Shore D scale. This increased capability enables harder (i.e., less flexible) tubing to be incorporated in endless belts, thus broadening the range of applications for endless belts.

Figure 5:
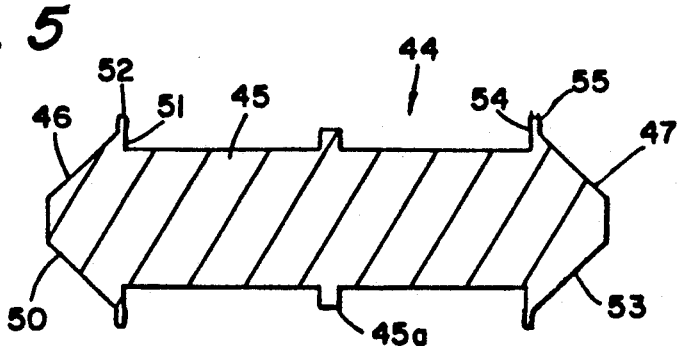
FIG. 5 is a cross-section of a connector of an alternative construction.

FIG. 5 discloses an alternative connector construction in which a connector 44 includes a central elongated body 45 with an optional centering ring 45a. Frusto-conical gripping heads 46 and 47 extend from the central elongated member 45. The connector 44, however, is constructed by shaping a conical surface 50 and then forming a radially extending surface or base 51 for the frusto-conical section. In this construction, the cutting tool is drawn radially outward along a line in the plane of the base 51 until the tool is proximate the intersection of the conical surface 50 with the plane of the base 51. Then the tool is withdrawn axially to form a feathered edge 52 that constitutes an erose outlying section that extends essentially radially from a central axis of the connector 44. Likewise, a conical surface 53 on the gripping head 47 is formed first. Then the screw machine equipment forms a radial surface 54 by drawing the cutting tool radially to a position proximate the intersection of the base 54 and conical surface 53. Axially withdrawing the cutting tool produces a feathered edge 55 that has the same essential characteristics as the feathered edge 52.

As another alternative, a piece of stock is initially machined to produce the cylindrical body 45 and central ring 45a such as shown in FIG. 5, leaving cylindrical end portions. A gripping head is formed by first forming an over-sized outline of the gripping head. Then a cutting tool moves parallel to the longitudinal axis with a cutting edge parallel to the conical surface. The cutting tool stops when the appropriate dimension is reached. This leaves a burr or feathered edge, such as the feathered edges 52 and 55.

Figure 6:
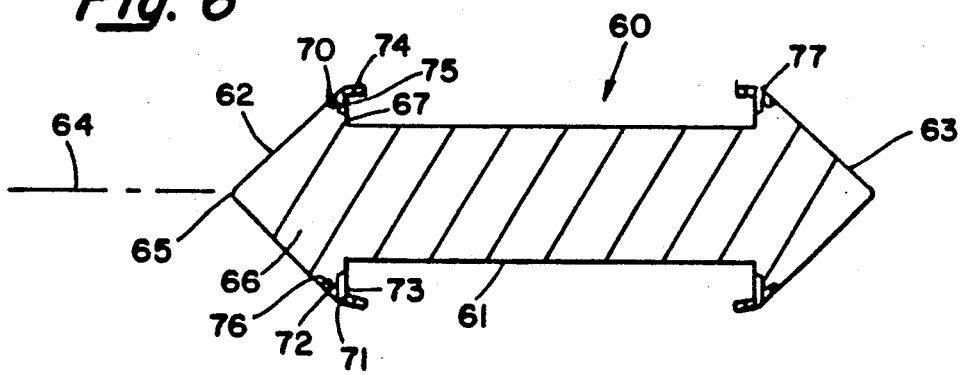
FIG. 6 is a cross-section of a two-piece connector constructed in accordance with this invention.
Figure 7:
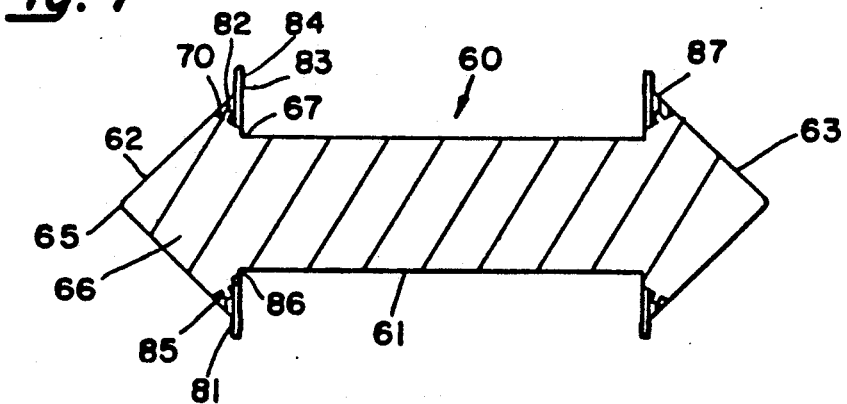
FIG. 7 is a cross-section of an alternate form of a two piece connector constructed in accordance with this invention.

Either embodiment can be used in many applications requiring a single metallic connector. It has been found that connectors can be composed of stainless steel, titanium, aluminum, bronze steel or other non-ductile machinable metals. It also is possible to adapt the connector shown in FIGS. 1 through 5 for applications in which non-metallic connectors are more appropriate because the environment may deteriorate metal exposed between the ends of the tubing. FIGS. 6 and 7 disclose a construction that utilizes a metallic ring in conjunction with a molded insert. Typical molding materials include Delrin, Nylon and other known moldable plastics.

Referring first to FIG. 6, a connector unit 60 comprises a molded central elongated member 61 and gripping heads 62 and 63 extending oppositely along an axis 64. The gripping heads 62 and 63 are formed as right cones in FIGS. 6 and 7. The gripping head 62, by example, includes an apex 65 on the axis 64 and a conical surface 66 extending therefrom and terminating at a radial surface or base 67. A chamfered surface 70 about the periphery of the base interconnects the conical surface 66 and radial base 67. This chamfered surface 70 supports an angular ring 71.

More specifically the annular ring 71 is machined from metal, such as titanium, stainless steel, bronze, steel or other non-ductile material. As shown in FIG. 6 the annular ring 71 includes a frusto-conical surface 72 that is an extension of the conical surface 66 and a radial surface 73 that is an extension of the radial surface 67. The annular ring 70 is machined in the same manner as the gripping head 22 shown in FIG. 1. Thus, in this particular embodiment a feathered edge 74 extends from the bases 67 and 73 to from an outlying erose section about the periphery of the surface or base 73. Typically machining operations form the ring 71 with its feathered edge 74. A key, in a form of a V-shaped notch 75 machined in a chamfered surface 76 of the ring 71, locks the ring 71 into the molded gripping head 62. A similar ring 77 is molded onto the gripping head 63.

FIG. 7 discloses an alternative embodiment with a molded connector 60 having a centrally elongated member 61 and gripping heads 62 and 63. The gripping head 62 extends from an apex 65 and terminates at an extension of a radial surface 67 forming a conical surface 66. A chamfered surface 70 extends between the conical surface 65 and the radial surface 67. These elements are analogous to like numbered elements in FIG. 6.

In this particular embodiment, a metallic annular ring 81 has a conical surface 82 that is an extension of the conical surface 66 and a radial surface 83 that is an extension of the radial surface 67. If the surface 82 is formed before the surface 83 using steps analogous to those used with the connector 44 shown in FIG. 5, the ring 81 has a radially extending feathered edge 84 as an outlying erose section. In this particular embodiment a square notch 85 is in a chamfered surface 86 serves as an alternative key configuration. During manufacture a ring 81 and a corresponding ring 87 are positioned in a mold. The remainder of the connector is then molded, with molding material being forced into the keys represented by the square notch 85.

FIGS. 6 and 7 therefore disclose three-piece connectors formed of diverse materials with a moldable material forming the main portion of the connector 60 and rings 71 and 77 and rings 81 and 87 constituting gripping rings of a metallic material molded onto the ends locked onto the periphery of the gripping heads. The rings form erose outlying sections from the base that bite into the interior surfaces of a belt material. As they are remote from the ends of the tubing and bite into the tubing, they are protected from hostile environments. A comparison of the connectors shown in FIGS. 6 and 7 and the one-piece connectors shown in FIGS. 1 through 5 illustrates that the cross sections for gripping purposes are identical in both approaches.

Figure 8:
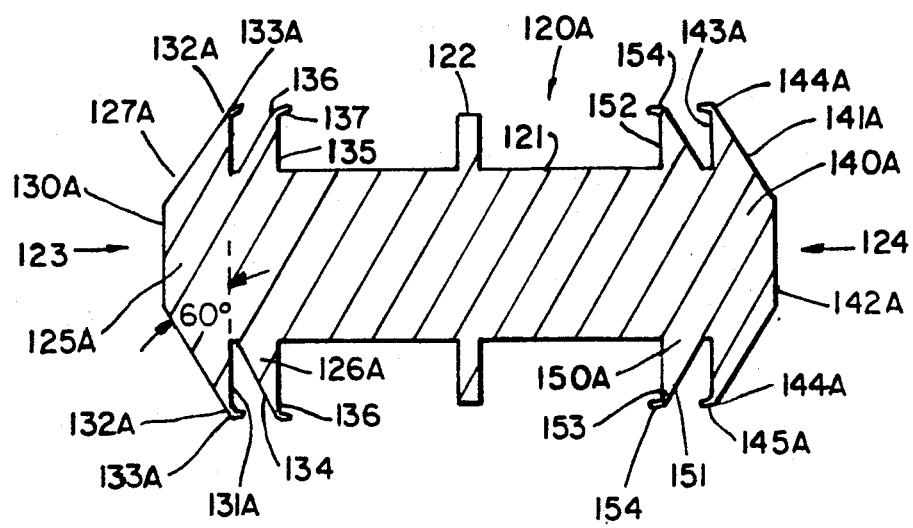
FIG. 8 is a cross-section of another form of a one-piece connector with multiple gripping heads at each end of the connector.
Figure 9:
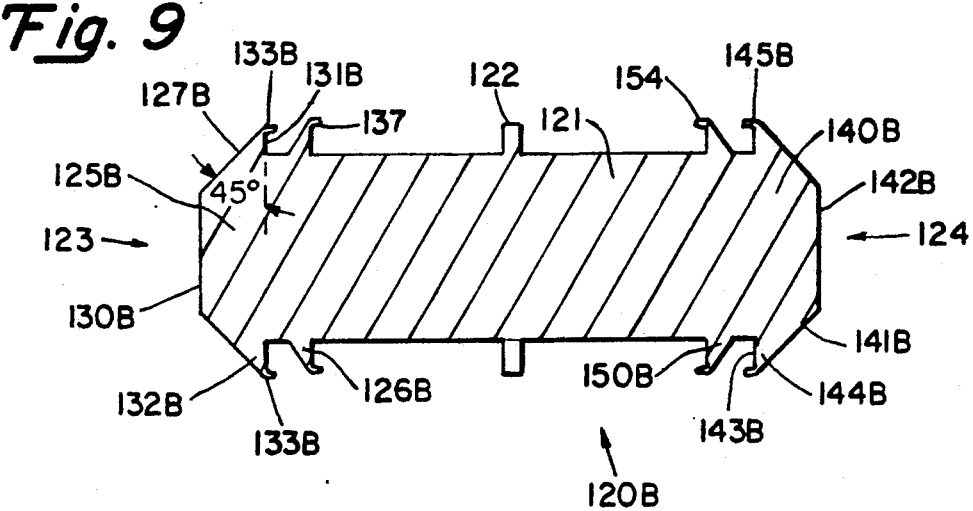
FIG. 9 is a cross-section of still another embodiment of a one-piece connector with multiple gripping heads at each end of the connector.

FIGS. 8 and 9 disclose two embodiments of a connector constructed in accordance with this invention that provide even greater holding power than the connectors shown in FIGS. 1 through 7. In these figures like reference numerals refer to like elements, the reference numerals having an "A" or "B" suffix where the elements are not identical. Any of the construction methods described with respect to the connectors in FIGS. 1 through 4 are adaptable to the structure shown in FIGS. 8 and 9 with straightforward modifications to produce the plural gripping head portions of FIGS. 8 and 9.

Referring to FIG. 8, a connector 120A constructed in accordance with this invention has an elongated central body portion 121 with an optional centering ring 122 and first and second axial ends 123 and 124. As shown in FIG. 8 the connector has plural gripping head portions 125A and 126A at the end 123. The gripping head portion 125A has an axially tapered surface 127A, a transverse end surface 130A and a gradually extending base planar surface 131A. The gripping head portion 125A therefore is bounded by the tapered surface 127A and the base planar surface 131A and has a frustoconical shape in which the axially tapered surface 127A has an increasing diameter in the direction of the centering ring 122. The axially tapered surface 127A and radially extending base planar surface 131A intersect at 132A. When the foregoing methods are applied, this intersection 132A is characterized by having an outlying, flexible, roughened feathered edge 133A that is integral with the gripping head portion 125A and that lies completely around the periphery of the gripping head portion, (i.e., the circumference formed at the intersection 132A in the specific embodiment of FIG. 8).

The inner gripping head portion 126A similarly has an axially tapered surface 134 with an increasing diameter as the taper extends toward the centering ring 122. A radially extending base planar surface 135 intersects the axially tapered surface 134 at an intersection 136 characterized by having an outlying, flexible, roughened feathered edge 137.

Thus the gripping head portions 125A and 126A form plural axially spaced gripping head portions. The spacing between the radially extending base planar surfaces 131A and 135 depends on the size and materials of the tubing. Generally the spacing increases as the tubing or belting diameter increases, although there should be some space between the radially extending base planar surface 131A and the intersection of the axially tapered surface 134 with the connector elongated body portion 121.

The connector 120A is also characterized by including an axially spaced gripping head portion 140A at the opposite axial end 124. The gripping head portion 140A has an axially tapered surface 141A having an increasing diameter toward the centering ring 122. The axial end 124 has a flat transverse end portion 142A. A radially extending planar base surface 143A intersects the axially tapered surface 141A at an intersection 144A. This intersection includes a roughened feathered flexible outlying edge 145A about the periphery or circumference of the gripping head portion 140A.

Similarly a second axially spaced gripping head portion 150A includes an axially tapered surface 151A and a radially extending base surface 152 formed with an intersection 153 characterized by an outlying, flexible, roughened feathered edge 154.

The angles formed at the intersections 132A, 136, 144A and 153 and the axial spacing between the edges 133A and 137 and between the edges 145A and 154 are, to a certain extent, dependent upon the belting size. It has been found, for example, that a sixty-degree (60°) angle at the intersections 132A, 136, 144A and 153 and a spacing of 0.020 inches between the rough feathered edges 133A and 137 and edges 145A and 154 provide good results for 3/16" belting. Specifically, such connectors work with the same range of materials as described with respect to FIGS. 1 through 4 and provide greater holding power. As previously indicated, the connectors of FIGS. 1 through 3 increase the holding power, that is the ability to withstand the force that will break the tubing apart at the connector, by 50% over the prior art. Initial analysis indicates that the connector shown in FIG. 8 can increase the holding power up to 300% of the prior art.

Further, the use of plural gripping head portions at each end of the connector reduces the potential for a connector to cut through the belting. This can particularly occur as belting passes over a pulley or through another circular path. Finally, the structure shown in FIG. 8 permits the connector 120A to be shorter than other connectors. This is particularly advantageous with small belting because a shorter connector allows the belting to pass through circular paths of smaller radius than possible with the single gripping head portion of FIGS. 1 through 3 or the prior art.

FIG. 9 discloses a similar connector 120B that is adapted for larger belting. Differences exist at the angle of the intersection between the tapered surfaces, such as tapered surface 127B, and the radially extending base surface, such as surface 131B. A 45° angle can be utilized with respect to ½" belting. This taper facilitates connector insertion into the ends of the belting. The spacing between the roughened feathered edges 133B and 137 and the corresponding spacing between the rough feathered edges 145B and 154 also increase.

A spacing of 0.050", for example, produces acceptable results in ½" belting. The larger angle at the intersections 132B and 144B decreases the overall depth of the outer gripping head portions 125B and 141B over the gripping head portions 125A and 140A as shown in FIG. 8. However, larger belting tends to be utilized in paths that have larger radii of curvature, so the increased length is acceptable.

The foregoing disclosure depicts several embodiments of a connector for joining the recessed ends of a belt to form an endless belt. Each embodiment includes an integral connector that comprises an elongated central body portion, such as the central bodies 21, 45, 61 and 121. Single gripping head portions 22 and 23, 46 and 47, and 62 and 63 each have a base portion with a transverse dimension exceeding the transverse dimension of a belt recess into which the coupling is inserted. Outlying, flexible, roughened feathered sections formed at the intersections of a tapered surface and radially extending planar base surfaces bite firmly into the belt sections under tension thereby to connect the belt ends in a positive manner. Plural axially spaced gripping portions at each connector end, such as portions 125A, 126A, 140A and 150A in FIG. 8 and 125B, 126B, 140B and 150B in FIG. 9 provide multiple flexible, roughened feathered edges for biting into each of the belt ends for increased holding power.

This invention has been disclosed in terms of certain embodiments. It will be apparent that many modifications can be made to the disclosed apparatus without departing form the invention. Therefore, it is the intent of the appended claims to cover all such variations and modifications as come within the true spirit and scope of this invention.

What is claimed as new and desired to be secured by Letters Patent of the United States is:

1. An integral connector for joining recessed end portions of a flexible belt of resilient material thereby to form an endless belt assembly, said connector comprising an elongated, axially extending central body portion having a given transverse dimension and a plurality of axially spaced gripping head portions at each end of said central body portion, each said gripping head portion being rigid and bounded by a tapered surface and by a base planar surface with a transverse dimension that exceeds the transverse dimension of the recesses at the end portions of the belt and of said central body portion, said tapered and base planar surfaces extending toward an intersection about the periphery of said gripping head portion and having a continuous outlying roughened, feathered edge section flexibly supported by and integrally formed with said gripping head portion at said intersection, said tapered and base planar surfaces at adjacent gripping head portions defining different angles of intersection, said outlying roughened, feathered edge sections being flexible about said intersections to provide multiple, spaced engagements between said connector and the flexible belt at each recessed end portion.

2. A connector for forming an endless belt as recited in claim 1 wherein said gripping head portions include an outer and inner gripping head portion at each end of said central body portion, the angle at said intersection of said tapered and base planar surfaces of said outer gripping head portions being greater than the angle at said intersection of said tapered and base planar surfaces of said inner gripping head portions.

3. A connector for forming an endless belt as recited in claim 2 wherein said first angle of intersection is less than said second angle of intersection.

4. A connector for forming an endless belt as recited in claim 2 wherein a centering ring portion for limiting the position of said connector in an endless belt circumscribes said central body portion at an axial midpoint thereof.

5. An endless belt assembly comprising:
A. belt means having a finite length and being hollow at least at the ends thereof, and
B. an integral connector means including:
  i. an elongate central body portion having a given transverse dimension, and
  ii. plural axially spaced gripping head portions at each end of said elongate central body portion, each said gripping head portion being rigid and bounded by a tapered surface and a base planar surface with a transverse dimension that exceeds the transverse inner dimensions of both said hollow tubing portions and of said central body portion, said tapered and base planar surfaces extending outwardly toward an intersection and having an outlying roughened, feathered edge section flexibly supported continuously about and integrally formed with said gripping head portion at each intersection, said connector means being inserted into the ends of said belt means thereby to form an endless belt with said outlying roughened, feathered edge sections biting into said belt means at multiple, spaced locations at each end of said belt means ends when said belt means is placed in tension.

6. A connector for forming an endless belt as recited in claim 5 wherein each of said gripping head portions has a conoidal shape.

7. A connector for forming an endless belt as recited in claim 5 wherein each said gripping portion has a frustoconical shape.

8. A connector for forming an endless belt as recited in claim 5 wherein said connector is metal.

9. A connector for forming an endless belt as recited in claim 5 wherein said intersections formed by said tapered surfaces and said base planar surfaces on adjacent axially spaced gripping head portions at each end of said connector have substantially the same angle.

10. A connector for forming an endless belt as recited in claim 5 wherein said central body portion is cylindrical and each said tapered surface tapers radially outward toward the center of said central body portion whereby said gripping head portions have a conoidal slope and face outwardly with respect to said connector.

11. A connector for forming an endless belt as recited in claim 10 wherein each said gripping head portion has a tapered surface lying at substantially the same angle with respect to said central body portion.

12. A connector for forming an endless belt as recited in claim 11 wherein a centering ring portion for limiting the position of said connector in an endless belt circumscribes said central body portion at an axial midpoint thereof.

13. A connector for forming an endless belt as recited in claim 5 wherein said gripping head portions include an outer and inner gripping head portion at each end of said central body portion, said intersections of said tapered surfaces and said base planar surfaces of said outer and inner gripping head portions having first and second angles of an intersection, respectively, that differ.

14. A connector for forming an endless belt as recited in claim 13 wherein said first angle is greater than said second angle.

15. A connector for forming an endless belt as recited in claim 13 wherein a centering ring portion for limiting the position of said connector in an endless belt circumscribes said central body portion at an axial midpoint thereof.

* * * * *